United States Patent [19]

Meyer

[11] 4,415,197
[45] Nov. 15, 1983

[54] HINGED HATCH ROOF ASSEMBLY FOR A VEHICLE CAB

[75] Inventor: Raymond J. Meyer, Cedar Falls, Iowa

[73] Assignee: Deere & Company, Moline, Ill.

[21] Appl. No.: 298,237

[22] Filed: Aug. 31, 1981

[51] Int. Cl.³ .............................................. B60J 7/08
[52] U.S. Cl. .................................... 296/216; 49/246; 114/201 R
[58] Field of Search ............................. 296/216, 217; 114/201 R; 49/246, 253

[56] References Cited

U.S. PATENT DOCUMENTS

| 1,951,534 | 3/1934 | Schwitzer | 49/253 |
| 3,632,160 | 1/1972 | Schlapp | 296/137 F |
| 4,099,766 | 7/1978 | Lorenz | 296/137 B |
| 4,119,340 | 10/1978 | Wolfe | 296/137 B |
| 4,300,440 | 11/1981 | Holter | 114/201 R |
| 4,329,917 | 5/1982 | Fisher | 296/216 |

FOREIGN PATENT DOCUMENTS

| 533581 | 12/1954 | Belgium | 296/216 |
| 835068 | 5/1960 | United Kingdom | 49/253 |

Primary Examiner—Bruce H. Stoner, Jr.
Assistant Examiner—John A. Carroll

[57] ABSTRACT

A hinged hatch assembly for the roof of a vehicle cab having an opening formed therein. The assembly includes a hatch which completely covers the opening when in a closed position. The hatch is connected to the roof of the vehicle cab by a pair of support arms. Each support arm contains a first and a second forked end whereby the first forked ends are pivotally attached by brackets to one side of the roof opening and the second forked ends are pivotally attached by brackets to the underside of the hatch. Sandwiched on each side of the brackets between the forked ends of the support arms are frictional elements which are spring loaded to impart a predetermined frictional force on the members. The frictional contact permits the hatch to be opened at various angles and at various positions relative to the plane of the roof and to remain in the desired position irrespective of any vibration or motion imparted into the vehicle. The hinged hatch roof assembly is capable of providing ventilation as well as serving as an escape route from the interior of the vehicle cab.

3 Claims, 8 Drawing Figures

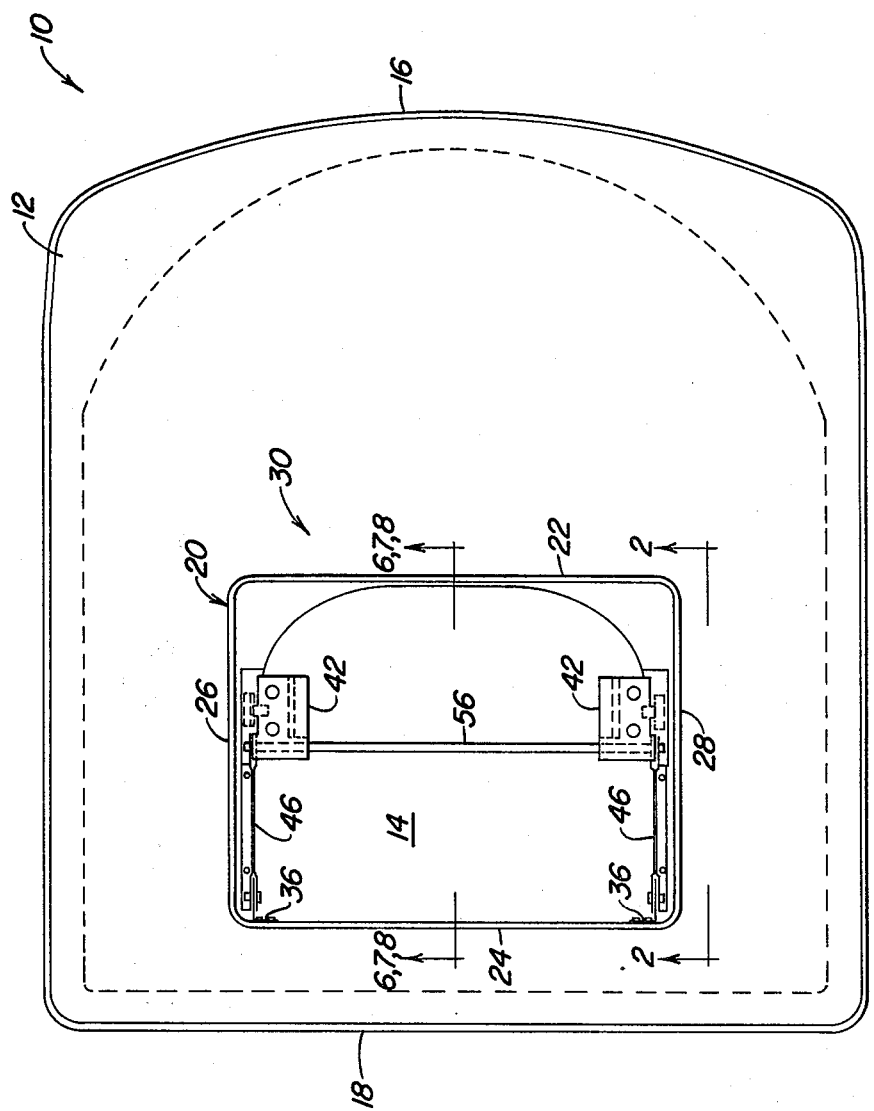

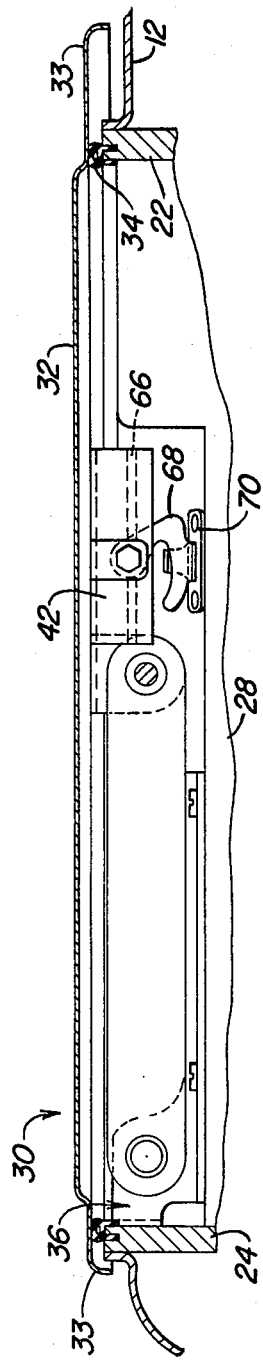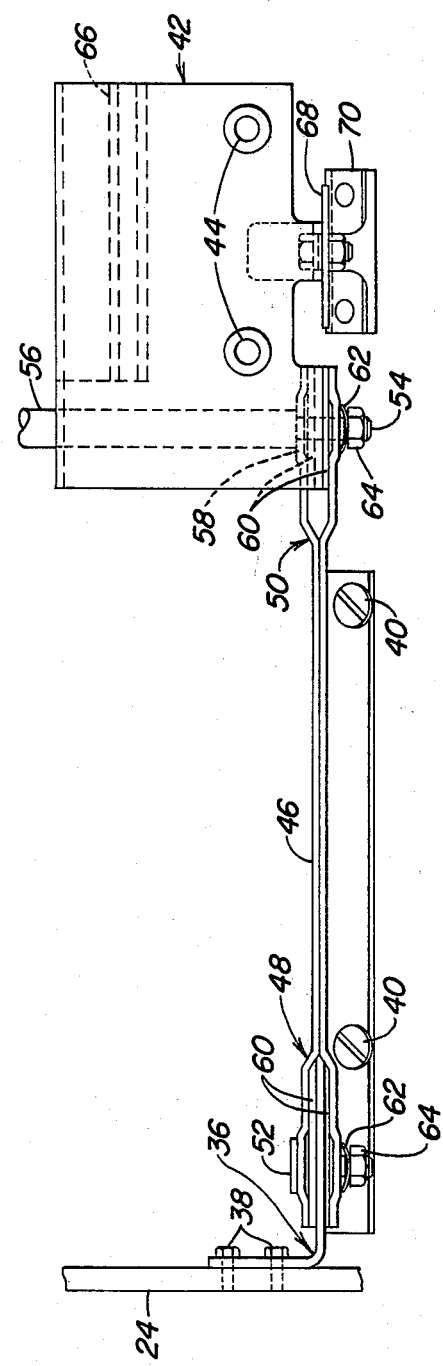

HINGED HATCH ROOF ASSEMBLY FOR A VEHICLE CAB

FIELD OF THE INVENTION

This invention relates to a hinged hatch roof assembly for a vehicle cab and more particularly to a hinged hatch roof assembly capable of providing ventilation as well as an escape route from the interior of a cab on an agricultural tractor.

BACKGROUND OF THE INVENTION

During the past two decades, many manufacturers of agricultural and industrial equipment have offered enclosed operator cabs for their vehicles. These cabs provide shelter to the operators from the surrounding environment and also muffle the noise created by the vehicle. The industry has readily accepted such enclosed cabs but has voiced concern about the absence of an emergency exit, because in some countries it is a legal requirement. In addition, there is a desire to provide a ventilation passage in the roof of the cab while at the same time sheltering the operator from inclement weather, such as rain. Two prior art patents which provide an emergency exit through the roof of a cab are U.S. Pat. No. 4,099,766 issued to Lorenz in 1978 and U.S. Pat. No. 4,119,340 issued to Wolfe in 1978. The Lorenz patent discloses a roof panel which is completely removable from the cab in the open position while the Wolfe patent discloses a swingable window unit which is pivotable about one side surface and is capable of being positioned either fully open or completely closed. Neither patent teaches an adjustable roof hatch that can be retained in various positions relative to the roof of the vehicle. A third patent, U.S. Pat. No. 3,622,160, issued to Schlapp in 1972 describes a sliding roof cover for a motor vehicle. The sliding roof cover is mounted on a pair of guide rails and is capable of forward and rearward travel relative to the roof of the vehicle. None of these designs fully satisfies the present needs of the industry.

SUMMARY OF THE INVENTION

Briefly, this invention relates to a hatch assembly hinged by a pair of support arms to move between open and closed positions relative to an opening provided in the roof of a vehicle cab. Each support arm has a first and a second forked end wherein the first forked ends are pivotally connected by brackets to the roof of the cab and the second forked ends are pivotally attached by brackets to the bottom of the hatch. Sandwiched on each side of the brackets between each forked end are a pair of frictional elements which are spring loaded to impart a predetermined amount of frictional contact between the members. This frictional force permits the hatch to be opened at varying angles relative to the roof. In the fully open position, the hatch is positioned perpendicular to the roof so that the operator can exit the cab in case of an emergency. In addition, the hatch can be pivoted about the first and second ends of the support arms so that outside air can be ventilated into or out of the cab while at the same time preventing the intrusion of precipitation.

The general object of this invention is to provide a hinged hatch roof assembly which can serve as an escape hatch as well as providing ventilation for the interior of a vehicle cab. A more specific object of this invention is to provide a hinged hatch roof assembly for a vehicle cab which can be retained in several positions.

Another object of this invention is to provide a hinged hatch roof assembly for a vehicle cab which can be opened relative to the direction of travel of the vehicle so that air can be vented into or out of the cab.

Still another object of this invention is to provide a hinged hatch roof assembly which can be positioned above the plane of the roof and parallel thereto for ventilation purposes while preventing the entrance of rain into the cab.

A further object of this invention is to provide a hinged hatch roof assembly for a vehicle cab which will remain in a set position irrespective of vibration or motion which is imparted into the vehicle as it traverses uneven terrain.

Still further an object of this invention is to provide a hinged hatch roof assembly for a vehicle cab which is simple to construct and economical to build.

Other objects and advantages of the present invention will become more apparent to those skilled in the art in view of the following description and the accompanying drawings.

BRIEF DESCRIPTION OF THE DRAWINGS

FIG. 1 is a top view of the roof of a vehicle cab showing the hinged hatch roof assembly with the hatch removed.

FIG. 2 is a side view of FIG. 1 showing the hatch in a closed position resting on the roof of the vehicle cab.

FIG. 3 is a top view of one half of the hinged hatch roof assembly as depicted in FIG. 1.

DETAILED DESCRIPTION OF THE PREFERRED EMBODIMENT

Figure 4:
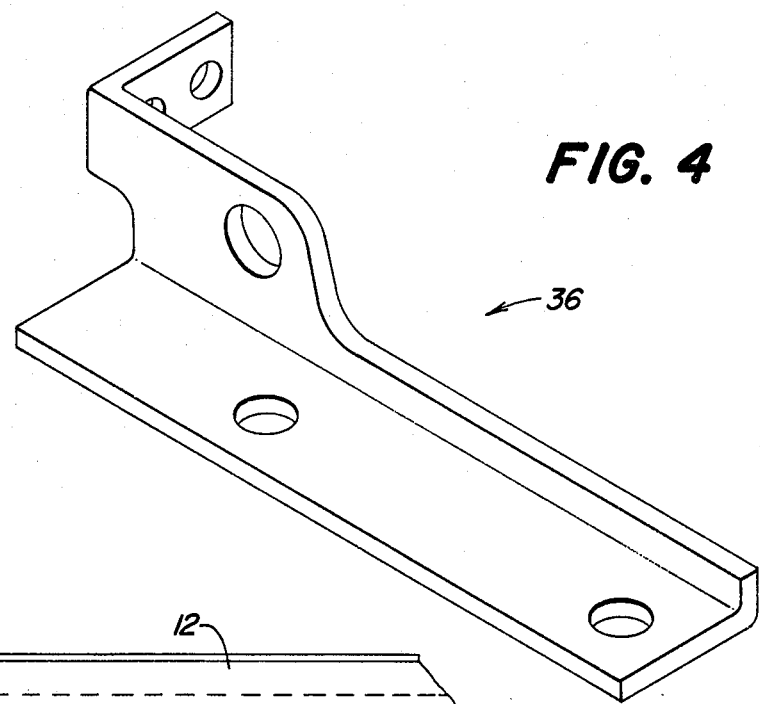
FIG. 4 is a perspective view of a support bracket.

Referring now to FIGS. 1-3, a vehicle cab 10 is shown with a roof 12 having an opening 14 formed therein. The opening 14 is of such proportions as to permit an operator of the vehicle to climb out through it in case of an emergency, i.e., such as when the door of the cab 10 is jammed shut. The roof 12 is constructed such that it has front and rear surfaces, 16 and 18 respectively, which correspond to the front and rear of the vehicle. Located about the periphery of the opening 14 is a framework 20, preferably having a rectangular configuration with a front member 22, a rear member 24 and two side members 26 and 28. The front and rear members 22 and 24 are aligned approximately parallel to the front and rear surfaces 16 and 18 respectively, of the roof 12.

Figure 6:
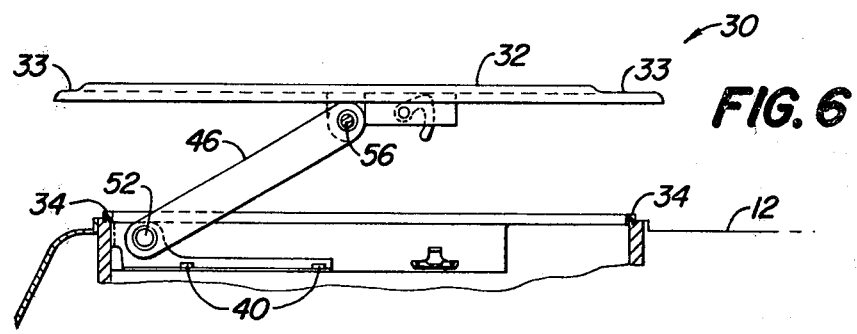
FIG. 6 is a side view of the hinged hatch roof assembly showing the hatch positioned away from and parallel to the roof of the vehicle cab.

A hinged hatch assembly 30 is connected to the rear frame member 24 and includes a hatch 32 which completely covers the opening 14 when in a closed position, as shown in FIG. 2. Positioned about the outer periphery of the hatch 32 is a lip 33, the underside of which contacts a flexible seal 34 mounted on the framework 20 when the hatch 32 is in the closed position. The lip 33 completely overhangs the outer periphery of the opening 14 and assists in preventing the passage of rain or snow into the cab 10 when the hatch 32 is positioned as shown in FIG. 6. The hinged hatch roof assembly 30 also includes a first pair of brackets 36 which are connected by bolts 38 to the rear frame member 24 and extend forward in a parallel relationship along the side frame members 26 and 28. The brackets 36, one of which is shown in FIG. 4, is designed to be further attached by screws 40 to the side frame members 26 and 28. A second pair of brackets 42 are connected by bolts 44 to a bottom surface of the hatch 32 and extend downward therefrom.

Attached between each pair of first and second brackets, 36 and 42 respectively, are support arms 46 each having a first and a second forked end, 48 and 50, respectively. Each support arm 46 can be constructed of two members welded together or be cast as a single piece. The first forked ends 48 of the support arms 46 are pivotally attached to the first pair of brackets 36 by threaded bolts 52. Similarly, the second forked ends 50 of the support arms 46 are pivotally attached to threaded ends 54 of a rod 56. The rod 56 is supported by the second pair of brackets 42 and serves to prevent the hatch 32 from being opened askewly or from becoming warped. As is best seen in FIG. 3, the rod 56 is welded to a leg of the second forked end 50 at surfaces 58 so as to be rigidly secured thereto. This enables the rod 56 to move as an integral part of the two support arms 46.

Assembled on each side of the first and second pairs of brackets, 36 and 42 respectively, and sandwiched between the first and second forked ends 48 and 50 of the support arms 46 are frictional elements 60. The frictional elements 60 are washer shaped members which are constructed of a material having a high coefficient of friction. The frictional elements 60 are held in place about the outer diameter of the bolts 52 and the threaded ends 54 of the rod 56 by biasing means 62 and adjustable nuts 64. As the adjustable nuts 64 are tightened, the biasing means 52, which can be springs, spring washers, Belleville washers, and the like, are compressed thereby squeezing the forked ends 48 and 50 together. By increasing the torque on the nuts 64, a greater frictional contact can be realized at the forked ends 48 and 50. The adjustable nuts 64 should be tightened such that the support arms 46 can be pivoted relative to the roof 12 and the hatch 32 can be pivoted relative to the support arms 46 and these desired positions can be maintained even when the vehicle is driven over uneven terrain.

Formed on the underside of each of the second pair of brackets 42 is a curved handle 66. The handles 66 enable the operator to push up or pull down on the hatch 32 so as to position it in the desired plane. Also attached to each of the second brackets 42 is a catch 68 which is matable with a corresponding latch 70. The latches 70 are secured to the side frame members 26 and 28 and enable the hatch 32 to be securely locked to the roof 12 so as to prevent the intrusion of an unauthorized person.

Figure 5:
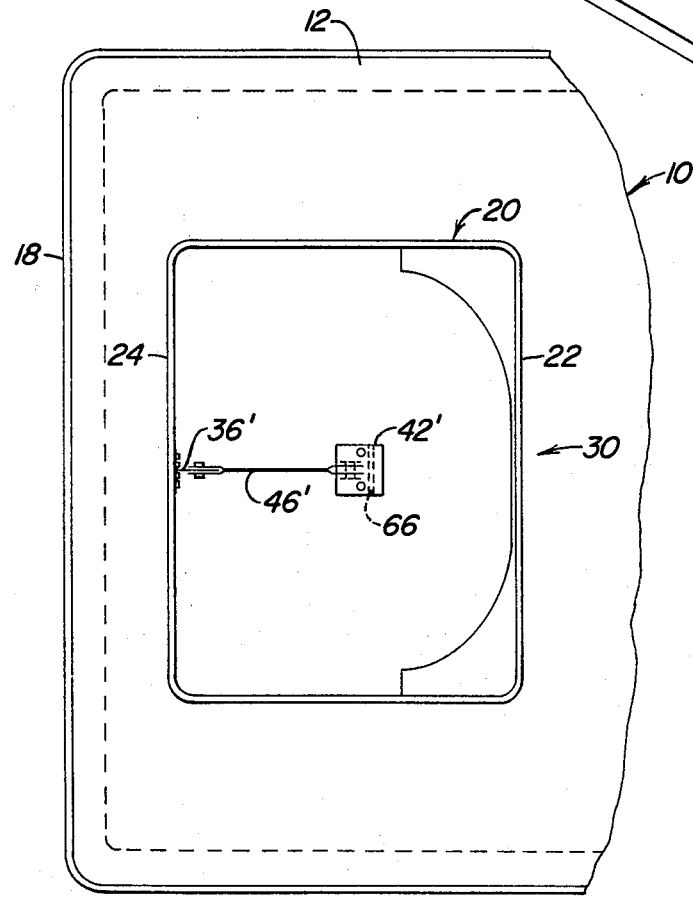
FIG. 5 is a top view of a second embodiment of the hinged hatch roof assembly having only one support arm.

Referring now to FIG. 5, a second embodiment of the hinged hatch roof assembly 30 is shown having a single support arm 46' pivotally attached between a first bracket 36' and a second bracket 42'. The hatch 32 would then be attached to the top surface of the second bracket 42' in a similar manner as depicted in FIG. 1. The use of only one support arm 46' is advantageous when the hatch 32 is made of a light weight material.

Figure 7:
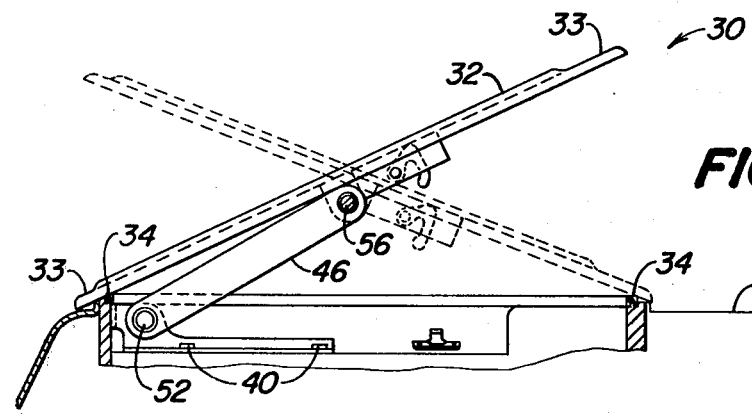
FIG. 7 is a side view of the hinged hatch roof assembly showing two different partially open positions.
Figure 8:
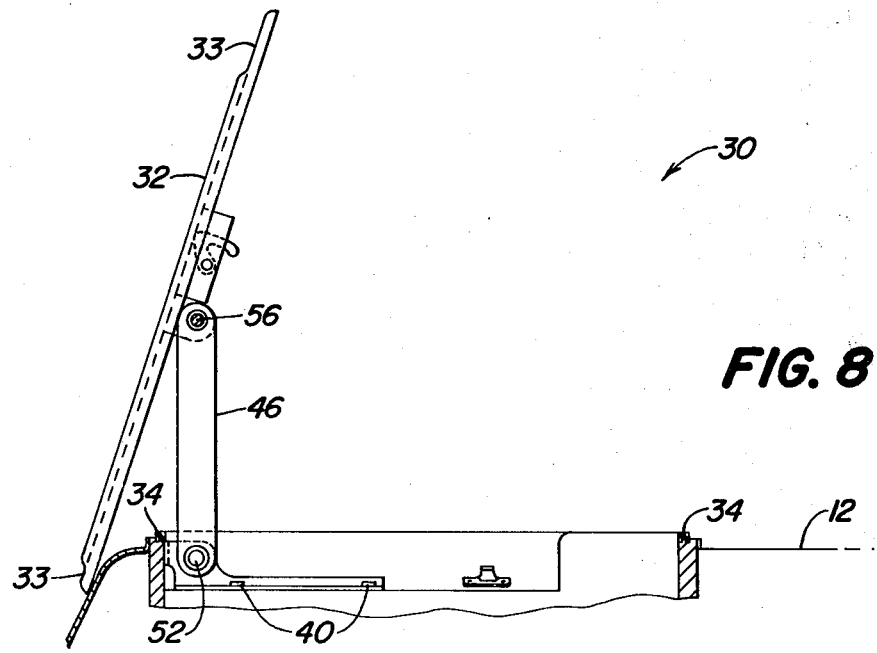
FIG. 8 is a side view of the hinged hatch roof assembly in a fully open position wherein the vehicle operator can escape in case of an emergency.

Turning now to FIGS. 6–8, several of the positions of the hatch 32 are shown. In FIG. 6, the hatch 32 is opened and aligned parallel to the roof 12. This position is advantageous on inclement days, such as rainy days, when the operator desires ventilation but does not want to get wet. This position is obtained by pivoting the support arms 46 about the central axis of the bolts 52 and pivoting the hatch 32 about the central axis of the rod 56. In FIG. 7, the hatch 32 is shown in a partially open position, facing either towards the front of the vehicle (solid lines) or towards the rear of the vehicle (dashed lines). When the hatch 32 is opened towards the front of the vehicle and the vehicle is driven forward, the hatch 32 acts as a scoop and channels the outside air down into the cab 10. This position is obtained by pivoting the support arms 46 about the central axis of the bolts 52. When the hatch 32 is opened towards the rear of the vehicle and the vehicle is driven forward, the hatch 32 forms a vent opening and permits the air within the cab 10 to be vented out. This position is obtained by pivoting the support arms 46 about the central axis of the bolts 52 as well as pivoting the hatch 32 about the central axis of the rod 56, through a greater angle than that shown in FIG. 6. It should be noted that in the partially opened position, the lip 33 of the hatch 32 will rest on a portion of the seal 34. This feature ensures that the entire air flow will be directed either into or out of the cab 10.

The position depicted in FIG. 8 is a fully open position whereby an escape route is provided so that the operator can exit from the interior of the vehicle cab 10. To obtain this position, the support arms 46 are pivoted about the central axis of the bolts 52 approximately 90 degrees with respect to the roof 12 and the hatch 32 is tilted slightly about the central axis of the rod 56. In this position, the lip 33 of the hatch 32 is raised off of the seal 34 and slides over the rear surface 18 of the roof 12.

While the invention has been described in conjunction with two specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A hinged hatch assembly comprising:
   (a) a hatch completely covering an opening in a roof when in a closed position;
   (b) a frame formed about the periphery of said opening having front and rear surfaces aligned approximately parallel to front and rear surfaces of said roof, said frame having a seal attached to a top surface thereof which cooperates with said hatch when said hatch is in said closed position;
   (c) a first pair of brackets each attached to both a rear surface of said frame and to a side surface of said frame and which extend forward within the periphery of said frame;
   (d) a second pair of brackets attached to a bottom surface of said hatch which extend downward therefrom;
   (e) a pair of support arms each having a first and a second forked end, each of said support arms being pivotally attached at said first forked end to one of said first pair of brackets and being pivotally attached at said second forked end to one of said second pair of brackets for permitting said hatch to pivot relative to said pair of support arms in two directions such that in one direction one side of said hatch will contact the rear surface of said frame and in the other direction an opposite side of said hatch will contact the front surface of said frame;

(f) a rod supported by said second pair of brackets and fastened at opposite ends to said second forked end of each of said support arms to prevent said hatch from being opened askewly;

(g) frictional washers located between said first and second forked ends of said support arms and each of said adjacent pair of brackets for providing frictional contact therebetween;

(h) adjustable spring means for applying a predetermined force between said frictional washers and said corresponding bracket and forked ends of said support arms to retain said support arms and said hatch in a predetermined position relative to said roof; and (i) locking means for locking said hatch to said roof, said locking means including a catch secured to a bottom side of said hatch which is engageable with a latch secured to said roof.

2. The hinged hatch assembly of claim 1 wherein said hatch contains a lip which completely surrounds and extends beyond the periphery of the opening in said roof when said hatch is in a closed position, a rear surface of said lip contacting a rear surface of said frame when said hatch is partially opened in one direction, a front surface of said lip contacting a front surface of said frame when said hatch is partially opened in a second direction, and said lip contacting a rear portion of said roof when said hatch is fully opened.

3. The hinged hatch assembly of claim 1 wherein each support arm is pivotally and frictionally attached at a first end to said roof for opening and closing said hatch relative to said roof and is pivotally and frictionally attached at a second end to said hatch for opening said hatch in two opposite directions relative to said support arms, said second end being located between said first end and a front edge of said roof opening when said hatch is in a closed position and being located directly above said first end when said hatch is swung to a fully open position.

* * * * *